United States Patent
Johnson et al.

(10) Patent No.: US 8,026,980 B2
(45) Date of Patent: Sep. 27, 2011

(54) METHOD AND SYSTEM FOR IMPROVING VIDEO COMBING DECISIONS

(75) Inventors: Shawn Val Johnson, Laguna Hills, CA (US); Brad Delanghe, Sunnyvale, CA (US); Brian Schoner, Fremont, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1359 days.

(21) Appl. No.: 11/539,394

(22) Filed: Oct. 6, 2006

(65) Prior Publication Data

US 2008/0084507 A1      Apr. 10, 2008

(51) Int. Cl.
*H04N 9/78* (2006.01)
(52) U.S. Cl. ......................... 348/668; 348/667
(58) Field of Classification Search ........... 348/663–670
See application file for complete search history.

(56) References Cited

U.S. PATENT DOCUMENTS

| | | | | |
|---|---|---|---|---|
| 5,093,715 A | * | 3/1992 | Tokuhara et al. | 348/667 |
| 5,367,342 A | * | 11/1994 | Bang | 348/667 |

* cited by examiner

*Primary Examiner* — M. Lee
(74) *Attorney, Agent, or Firm* — McAndrews, Held & Malloy, Ltd.

(57) ABSTRACT

A system and method for improving decisions for 2D combing of a video. A 2D-comb is applied to a baseband video signal, thus producing a chroma component of the signal, and an associated combing error. A narrowband filter is applied to the chroma component to produce a filtered chroma component. The chroma component and the filtered chroma component are blended in proportions based on the amount of combing error to produce a new chroma component. A larger combing error induces selection or blending a larger portion of the filtered chroma component, which as a result of narrowband filtering contains less cross-chroma error. Subtracting the new chroma component from the baseband video signal produces a new luma component. The chroma component can also be filtered using a wider band filter to produce a non-complementary chroma component to be subtracted from the baseband video signal to produce the new luma component.

18 Claims, 10 Drawing Sheets

METHOD AND SYSTEM FOR IMPROVING VIDEO COMBING DECISIONS

CROSS-REFERENCE TO RELATED APPLICATIONS/INCORPORATION BY REFERENCE

[Not Applicable]

FIELD OF THE INVENTION

Certain embodiments of the invention relate to processing of video signals. More specifically, certain embodiments of the invention relate to a method and system for improving video combing decisions.

BACKGROUND OF THE INVENTION

A composite video signal is the sum of a luminance (brightness) signal and a chrominance (color) signal. These signals may be referred to as luma and chroma signals, respectively. The frequency ranges of the luma and chroma signals are designed to overlap. In video processing, the luma and chroma signal components are added together in order to generate a composite video signal. The luma and chroma video elements are integrated and broadcasted as a single composite video stream. Once the broadcasted composite signal is received, the luma and chroma signal components must be separated in order for the video signal to be processed and displayed. A comb filter may be utilized for separating the chroma and luma video signal components. For example, a television may be adapted to receive a composite video input and utilize an integrated comb filter to separate the chroma and luma video signal components. However, before the television can display the received video signal, the chroma and luma video components have to be separated.

Several combing techniques exist, including spatial or 2D techniques and temporal or 3D techniques. In conventional video processing, there are three ways to separate the luma and chroma video components and these include combing horizontally, combing vertically, and combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth The first way to separate the luma and chroma video components is by horizontal combing. Horizontal combing may be accomplished by utilizing a notch filter, for example. Since the chroma signal component in a composite video signal may be modulated at 3.58 MHz, a notch filter set at 3.58 MHz may be utilized. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, which involves combing only within one field at a time and without any temporal combing.

During combing in a current frame, for example, if the current line is added to the previous line, the chroma content may cancel out and two times the luma content may be obtained. On the other hand, if the previous line is subtracted from the current line, the luma content may cancel out and two times the chroma content may be obtained. In this way, luma and chroma content may be separated from the composite video signal for further processing. However, vertical combing may result in a reduced vertical bandwidth.

Another way to comb a composite signal is to comb temporally. Combing temporally comprises combing between two adjacent frames, for example, the current frame and the previous frame. Further, temporal combing may be characterized by a reduced temporal bandwidth. Luma and chroma content may be separated by utilizing the same addition and subtraction method between a current line and a previous line as it was utilized with vertical combing.

The problem with using one combing technique over another is that while one technique may work well in certain portions of a video sequence or a video image, it may not work as well with other portions. As a result, using "the best" combing technique may result in high error rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for improving video combing decisions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for improving video combing decisions.

Figure 1:
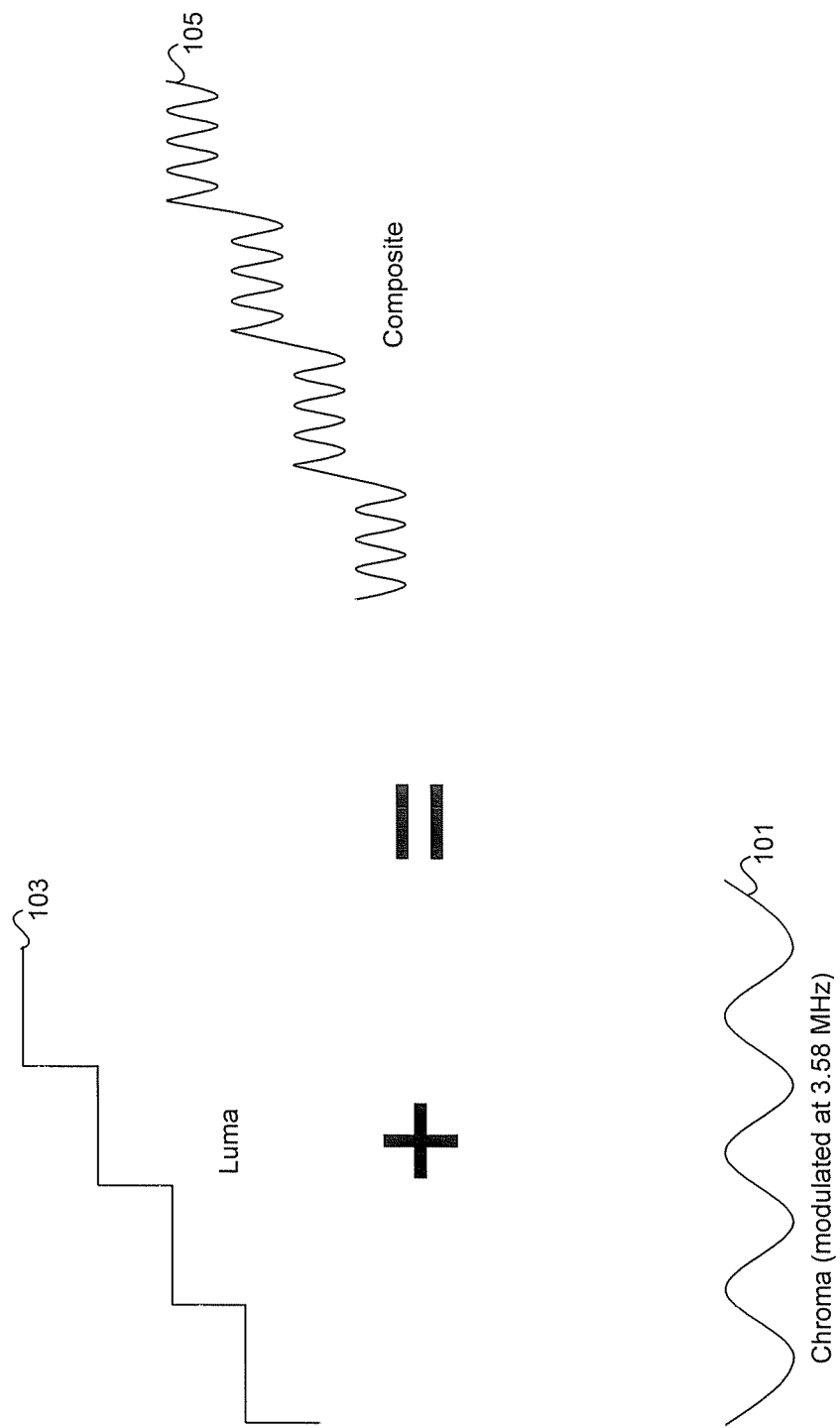
FIG. 1 is a diagram illustrating generation of a conventional composite video signal, in accordance with an embodiment of the present invention.

FIG. 1 is a diagram illustrating generation of a conventional composite video signal, in accordance with an embodiment of the present invention. Referring to FIG. 1, a conventional composite video signal 105 is generated from a luma component 103 and a chroma component 101. The composite video signal 105 is generated by adding the chroma video signal component 101 and the luma video signal component 103. The chroma signal component 101 may be modulated at 3.58 megahertz and it may or may not comprise a constant chroma across the entire line. The luma signal component 103 may increase in amplitude in a stair step fashion or it may not.

Figure 2:
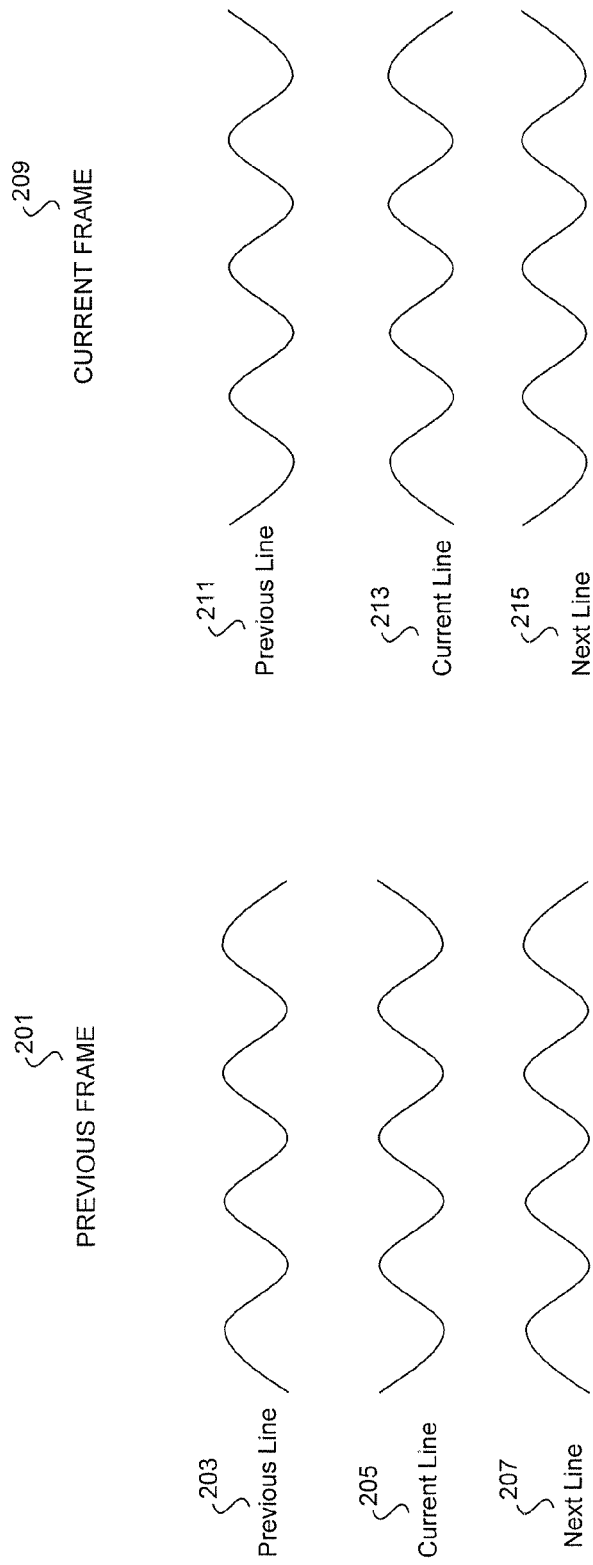
FIG. 2 is a diagram illustrating modulated chroma signals in contiguous composite video frames, in accordance with an embodiment of the present invention.

FIG. 2 is a diagram illustrating modulated chroma signals in contiguous composite video frames, in accordance with an embodiment of the present invention. The chroma component may be modulated so that a frequency of each successive line of video may be phase-shifted by 180 degrees with respect to the previous line. Referring to FIG. 2, the previous frame 201 may comprise a previous line 203, a current line 205, and a next line 207. Similarly, the current frame 209 may comprise a previous line 211, a current line 213, and a next line 215. The current line 213 in the current frame 209 may be phase-shifted by 180 degrees from the previous line 211 in the current frame 209, as well as from the next line 215 in the current frame 209. Similarly, the current line 205 in the previous frame 201 may be phase-shifted by 180 degrees from the previous line 203 in the previous frame 201, as well as from the next line 207 in the previous frame 201. In addition, since frames in the contiguous composite video signal are at a frequency rate of 59.94 Hz, there may be a 180-degree phase shift between two adjacent frames, for example, the current frame 209 and the previous frame 201. Correspondingly, the current line 213 in the current frame may be 180 degrees phase-shifted from the current line 205 in the previous frame 201.

Figure 3:
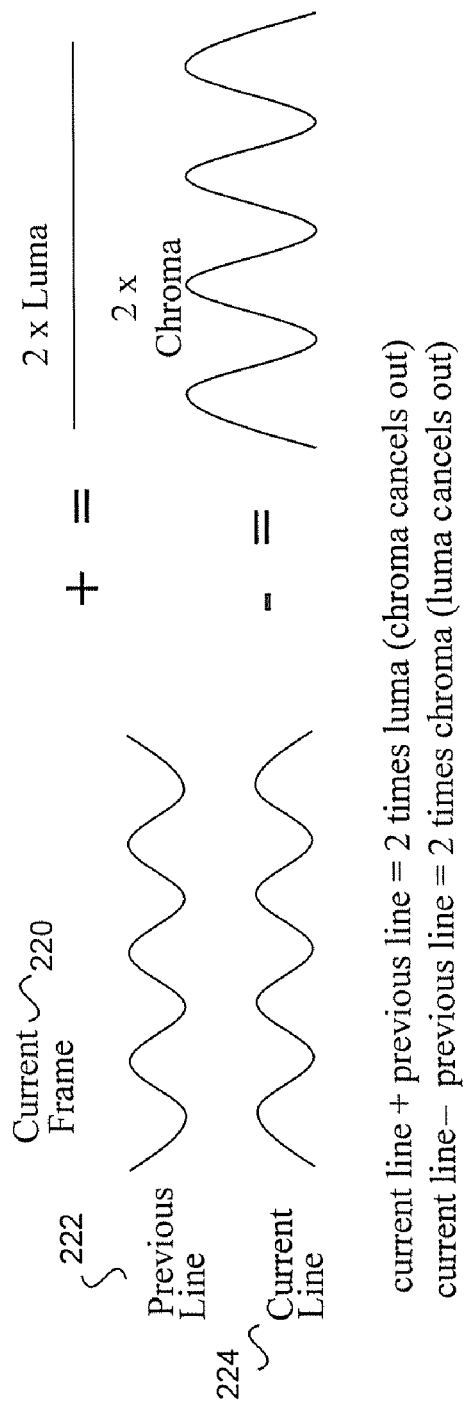
FIG. 3 is a diagram illustrating combing of a correlated current line and a previous line in a current frame, in accordance with an embodiment of the present invention.

FIG. 3 is a diagram illustrating combing of a correlated current line and a previous line in a current frame, in accordance with an embodiment of the present invention. In this case, there is no vertical bandwidth and the previous line 222 and the current line 224 are perfectly correlated. The current line 224 may be added with the previous line 222 and two times luma may be obtained. Similarly, the previous line 222 may be subtracted from the current line 224 so that two times chroma may be obtained.

Figure 4:
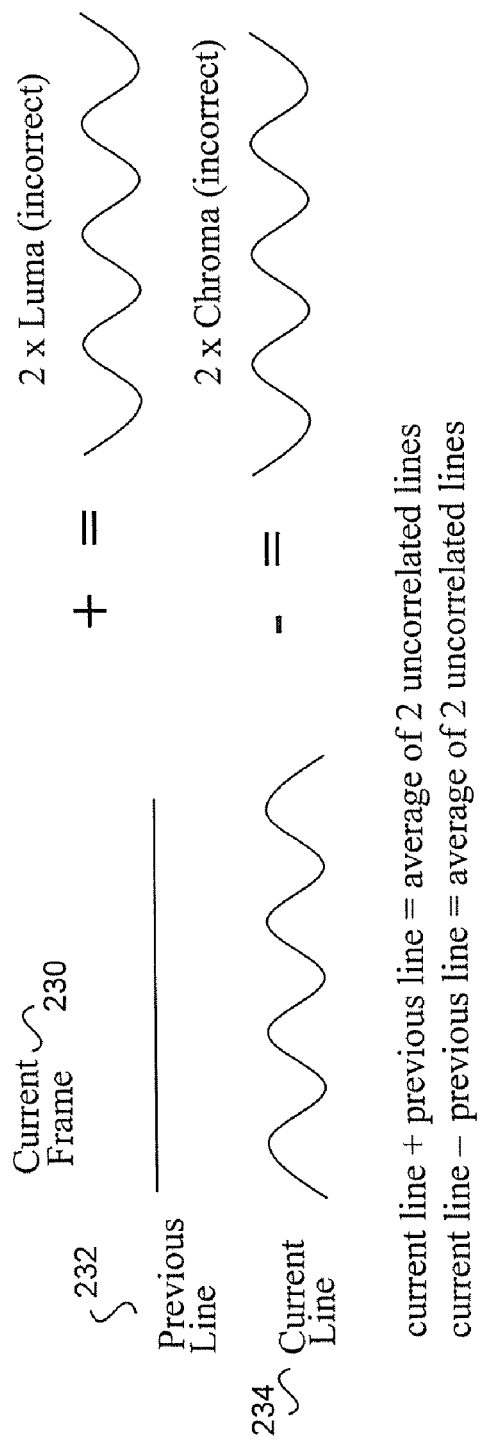
FIG. 4 is a diagram illustrating combing of a non-correlated current line and a previous line in a current frame, in accordance with an embodiment of the present invention.

FIG. 4 is a diagram illustrating combing of a non-correlated current line and a previous line in a current frame, in accordance with an embodiment of the present invention. In this case, there may be significant vertical bandwidth. The vertical bandwidth may be high enough so that there may be no correlation between the current line 234 and the previous line 232. When the current line 234 and the previous line 232 are combed together, there may be significant error in both the luma and chroma. This may produce combing artifacts in the obtained combed video signal. A substantially the same result may be obtained when combing temporally when there is temporal bandwidth, which indicates motion. Higher bandwidth in a given direction may cause combing in that direction to result in more incorrectly separated luma and chroma.

Figure 5:
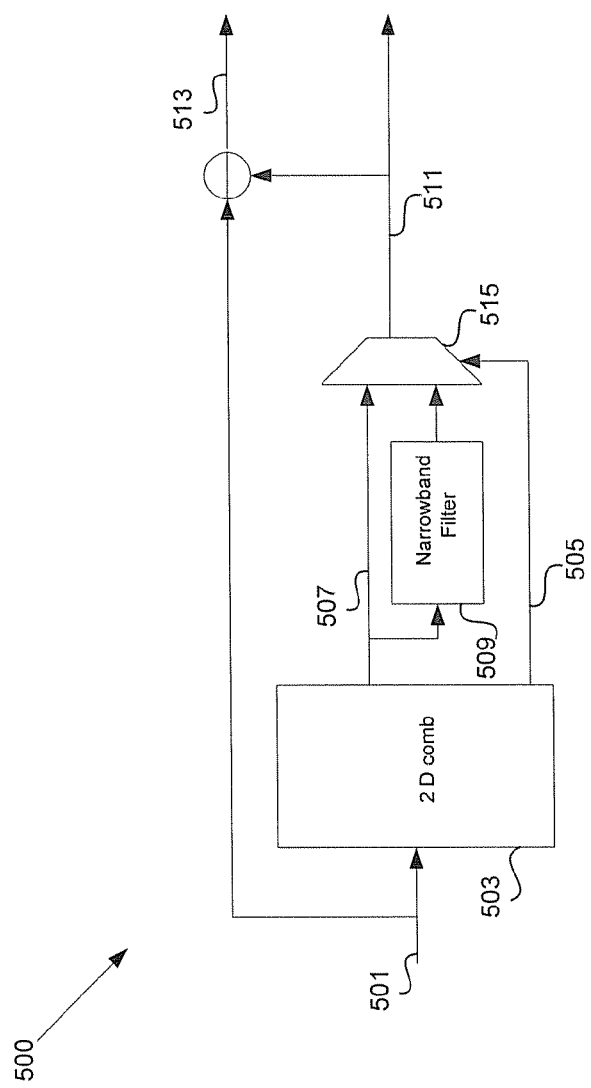
FIG. 5 is a diagram illustrating an exemplary video processing system implementing complimentary 2D combing, in accordance with an embodiment of the present invention.

FIG. 5 is a diagram illustrating an exemplary video processing system implementing complimentary 2D combing, in accordance with an embodiment of the present invention. Referring to FIG. 5, a video processing system 500 may comprise a 2D comb 503, a narrowband filter 509, and a multiplexer 515. A baseband composite input video signal 501 may be communicated to the 2D comb 503. The 2D comb 503 may generate output signals 507 and 505. The signal 507 may be the 2D chroma component of the baseband composite video signal 501. The signal 505 may be the combing error. As a result of filtering, the 2D comb 503 may remove some of the energy of the chroma signal that may be caused by cross-chroma errors and luma. The narrowband filter 509 may filter the 2D chroma component 507, which may result in removing more energy, and removing large cross-chroma errors from the 2D chroma component.

The multiplexer 515 may multiplex the output of the narrowband filter 509 and the 2D chroma component 507. The control signal for the multiplexer 515 may be the combing error signal 505, which was generated by the 2D comb 503. Based on the amount of combing error, the multiplexer 515 may select one of the two signals, either the 2D chroma component 507 or the filtered 2D chroma component. The selected chroma is output as the new chroma signal 511 for display. The new chroma signal 511 may be also subtracted from the baseband composite video signal 501, which may result in the new luma signal 513. The new chroma signal 511 and the new luma signal 513 may be displayed together.

The 2D comb 503 may be a conventional 2D comb, which may make a decision regarding the appropriate combing based on the content of the baseband composite input video signal 501. The decision may be based on a calculation of an error value, which may indicate how appropriate vertical combing may be for a current image. This variable may evaluate combing of a plurality of combinations of the top, current, and bottom lines to find the output with the smallest amplitude. If there is a lot of luma energy in the chroma frequency band, the error value may exceed a certain threshold and as a result, it may be determined that vertical combing may not be selected, and instead perform horizontal combing.

Another variable associated with the image and used in the determination of whether to perform horizontal or vertical combing may indicate a measure of parasitic luma generated due to improper vertical combing applied in images with gradual vertical chroma amplitude variation. When the value of this variable exceeds a certain threshold, and the parasitic amplitude modulation becomes visible, vertical combing may not be selected.

The video processing system 500, therefore, may allow choosing between vertical combing and horizontal combing within the 2D comb 503, and additionally, the choice of further narrowband horizontal filtering by the narrowband filter 509. The two signals produced by the system 500, the new chroma signal 511 and the new luma signal 513 may be complimentary, since the new chroma signal 511 is subtracted from the input baseband composite video signal 501 to produce the complimentary new luma signal 513. Placing the narrowband filter 509 after the 2D comb 503 may allow both filters to remove more energy from the chroma signal 507. Removing more energy from the chroma signal may result in leaving more energy in the luma signal.

Figure 6:
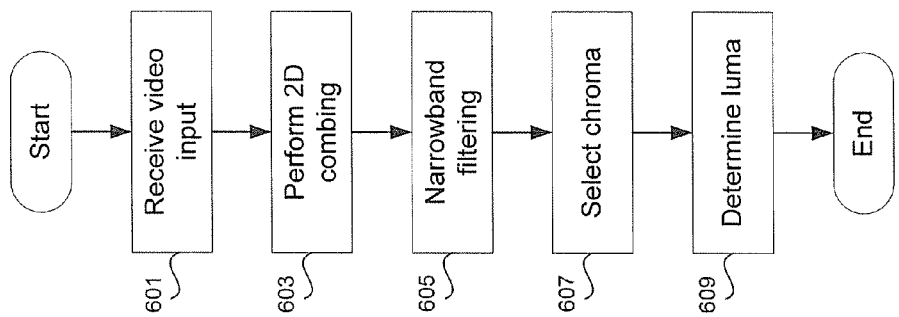
FIG. 6 is a flow diagram illustrating an exemplary method of implementing complimentary 2D combing, in accordance with an embodiment of the present invention.

FIG. 6 is a flow diagram illustrating an exemplary method of implementing complimentary 2D combing, in accordance with an embodiment of the present invention. Referring to FIG. 5 and FIG. 6, at 601 a baseband composite video signal 501 may be input into a video processing system 500. The baseband composite video signal 501 may comprise video data, which may include chroma and luma components. The baseband composite video signal 501 may then be processed by applying a 2D comb 503 at 603. The output of the 2D comb 503 may comprise the chroma of the input signal and a combing error value associated with the processed video image. The chroma signal output by the 2D comb 503 may have some of the cross-chroma energy and luma energy removed as a result of filtering, hence enhancing the chroma. At 605, a narrowband filter 509 may filter the chroma value output by the 2D comb 503, and as a result output a twice-filtered chroma signal, where the twice-filtered chroma signal may have less cross-chroma energy and luma energy than the chroma output by the 2D comb 503. The chroma signal output by the 2D comb 503 and the twice-filtered chroma signal output by the narrowband filter 509 may then be multiplexed to select one of the two chroma signals at 607. The combing error value output by the 2D comb 503 may be used as a control signal in multiplexing the two chroma signals. If the error value is not too large, indicating that the chroma signal output by the 2D comb 503 had most of the cross-chroma and luma energy removed, then there may be no need to utilize the twice-filtered chroma signal. If the error value is too large, then the twice-filtered chroma signal may be selected instead. At 609, the selected chroma signal may be used to determine the new luma value by subtracting the selected chroma signal from the input broadband composite video signal 501.

Figure 7:
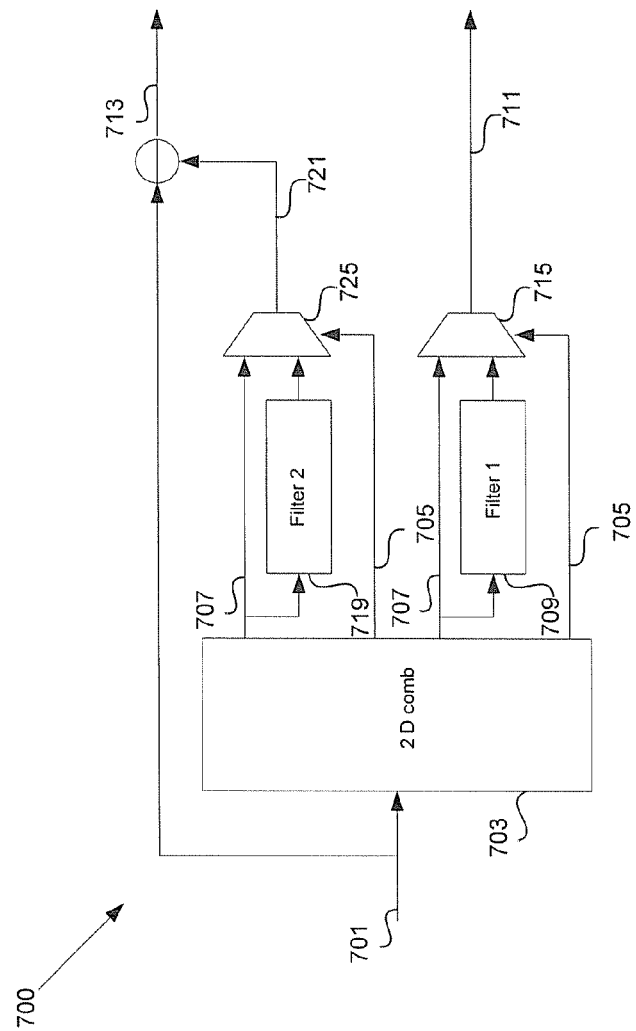
FIG. 7 is a diagram illustrating an exemplary video processing system implementing non-complimentary 2D combing, in accordance with an embodiment of the present invention.

FIG. 7 is a diagram illustrating an exemplary video processing system implementing non-complimentary 2D combing, in accordance with an embodiment of the present invention. Referring to FIG. 7, an exemplary video processing system 700 may comprise a 2D comb 703, filters 709 and 719, and blenders 715 and 725. A baseband composite input video signal 701 may be communicated to the 2D comb 703. The 2D comb 703 may generate output signals, a first signal 707 and a second signal 705. The first signal 707 may be the 2D chroma component of the baseband composite video signal 701. The second signal 705 may be the combing error. As a result of filtering, the 2D comb 703 may remove some of the energy of the chroma signal that may be caused by cross-chroma errors and luma.

The first filter 709 may be a narrowband filter and may filter the 2D chroma component 707, which may result in removal of more energy, and removal of large cross-chroma errors from the 2D chroma component 707. The blender 715 may then blend the outputs of the first filter 709 and the 2D chroma component 707. The control signal for the blender 715 may be the combing error signal 705, which was generated by the 2D comb 703. Based on the amount of combing error, the blender 715 may then select one of the two signals, either the 2D chroma component 707 or the filtered 2D chroma component 707, or blend portions of the two signals, where the amount contributed by each signal may depend on the amount of combing error. The resulting chroma may then be a first new chroma output signal 711.

The second filter 719 may be a filter with a wider band than the first filter 709, and may filter the 2D chroma component 707, which may result in removal of some energy, and some cross-chroma errors from the 2D chroma component 707. The multiplexer 725 may then multiplex the output of the second filter 719 and the 2D chroma component 707. The control signal for the multiplexer 715 may be the combing error signal 705, which was output by the 2D comb 703. Based on the amount of combing error, the blender 725 may then select one of the two signals, either the 2D chroma component 707 or the filtered 2D chroma component 707, or blend portions of the two signals, where the amount contributed by each signal may depend on the amount of combing error. The resulting chroma may be a second new chroma output signal 721.

The second new chroma output signal 721 may be subtracted from the baseband composite video signal 701, which may result in a new luma signal 713. The first new chroma output signal 711 and the new luma signal 713 may then be displayed together. Since the new luma signal 713 is the result of subtracting the second new chroma output signal 721, but is combined with the first new chroma output signal 711, the new luma signal 713 and the first new chroma output signal 711 do not compliment each other, but combining them may yield less error in the image displayed than if the complimentary signals are combined.

In an embodiment of the present invention, in regions of large combing error, i.e., where the error signal 705 is large, the filtered signal may be selected by the blenders 715 and 725, where the output signals have more energy removed from them. The first filter 709 may remove a large amount of energy from the chroma signal, and the second filter 719, may take less energy out of the chroma channel, and as a result, when subtracted from the baseband composite video signal 701, remove a large amount of energy from the luma signal. The two resulting signals, the new chroma signal 711 and the new luma signal 713 may be non-complimentary as a result. However, in regions with small combing error, i.e., where the error signal 705 is small, the signals from the first filter 709 and the second filter 719 may not be selected by the blenders 715 and 725 and as a result, the two resulting signals, the new chroma signal 711 and the new luma signal 713 may be complimentary signals.

The 2D comb 703 may be a conventional 2D comb, which may make a decision regarding the appropriate combing based on the content of the baseband composite input video signal 701. The decision may be based on a calculation of an error value, which may indicate how appropriate vertical combing may be for a current image. This error value may be used to evaluate combing of a plurality of combinations between the top, current, and bottom lines to find the output with the smallest amplitude. If there is a lot of luma energy or the amount of luma energy is greater than a specified value in the chroma frequency band, the error value may exceed a certain threshold. As a result, it may be determined that vertical combing may not be selected, and instead perform horizontal combing.

Figure 8:
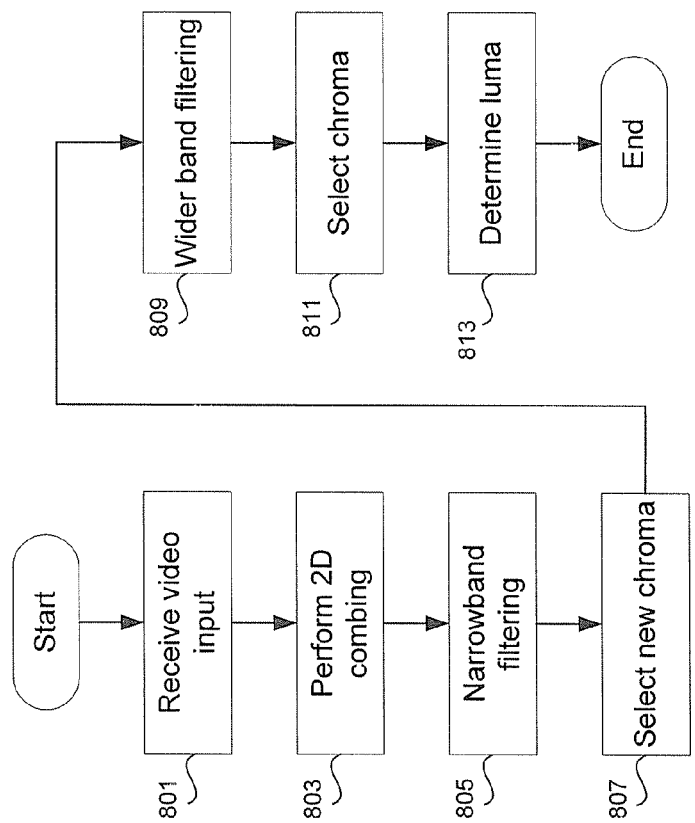
FIG. 8 is a flow diagram illustrating an exemplary method of implementing non-complimentary 2D combing, in accordance with an embodiment of the present invention.

FIG. 8 is a flow diagram illustrating an exemplary method of implementing non-complimentary 2D combing, in accordance with an embodiment of the present invention. Referring to FIG. 7 and FIG. 8, at 801 a baseband composite video signal 701 may be input into a video processing system 700. The baseband composite video signal 701 may comprise video data, which may include chroma and luma components. The baseband composite video signal 701 may then be processed by applying a 2D comb 703 at 803. The output generated from the 2D comb 703 may comprise the chroma of the input signal and a combing error value associated with the processed video image. The chroma signal output by the 2D comb 703 may have some of the cross-chroma energy and luma energy removed as a result of filtering, therefore enhancing the chroma.

At 805, a narrowband filter 709 may filter the chroma value output by the 2D comb 703. As a result, a twice-filtered chroma signal may be generated, where the twice-filtered chroma signal may have less cross-chroma energy and luma energy than the chroma signal generated by the 2D comb 703. The chroma signal generated by the 2D comb 703 and the twice-filtered chroma signal generated by the narrowband filter 709 may then be blended to generate a new chroma signal at 807. The combing error value output by the 2D comb 703 may be used as a control signal in blending the two chroma signals. If the error value is not too large or not greater than a specified value, this may indicate that the chroma signal output by the 2D comb 703 had most of the cross-chroma and luma energy removed. As a result, there may be no need to utilize the twice-filtered chroma signal or a smaller portion thereof may be blended. If the error value is too large or greater than a specified value, then the twice-filtered chroma signal may be selected instead, or a larger portion thereof may be used in the blending.

At 809, a second filter 719 with a wider band than the first filter 709 may filter the chroma value output by the 2D comb 703. As a result, a twice-filtered chroma signal may be generated, where the twice-filtered chroma signal may have less cross-chroma energy and luma energy than the chroma output by the 2D comb 703. However, the amount of energy removed by the second filter 719 may be less than the amount of energy removed by the first filter 709. The chroma signal output by the 2D comb 703 and the twice-filtered chroma signal output by the second filter 719 may then be blended to generate a new chroma signal at 811. The combing error value output by the 2D comb 703 may be used as a control signal in blending the two chroma signals. If the error value is not too large or less than a specified value, this may indicate that the chroma signal output by the 2D comb 703 had most of the cross-chroma and luma energy removed. As a result, there may be no need to utilize the twice-filtered chroma signal or a smaller portion thereof may be blended. If the error value is too large or greater than a specified value, then the twice-filtered chroma signal may be selected instead, or a larger portion thereof may be used in the blending. At 813, the chroma signal selected at 811 may be used to determine the new luma value by subtracting the selected chroma signal from the input broadband composite video signal 701. The new luma value and the new chroma value may be combined for display. When the error value is large or greater than a specified value, the new chroma value and the new luma value may be non-complimentary. However, in regions with less combing error, the new luma value and the new chroma value may be complimentary.

Figure 9:
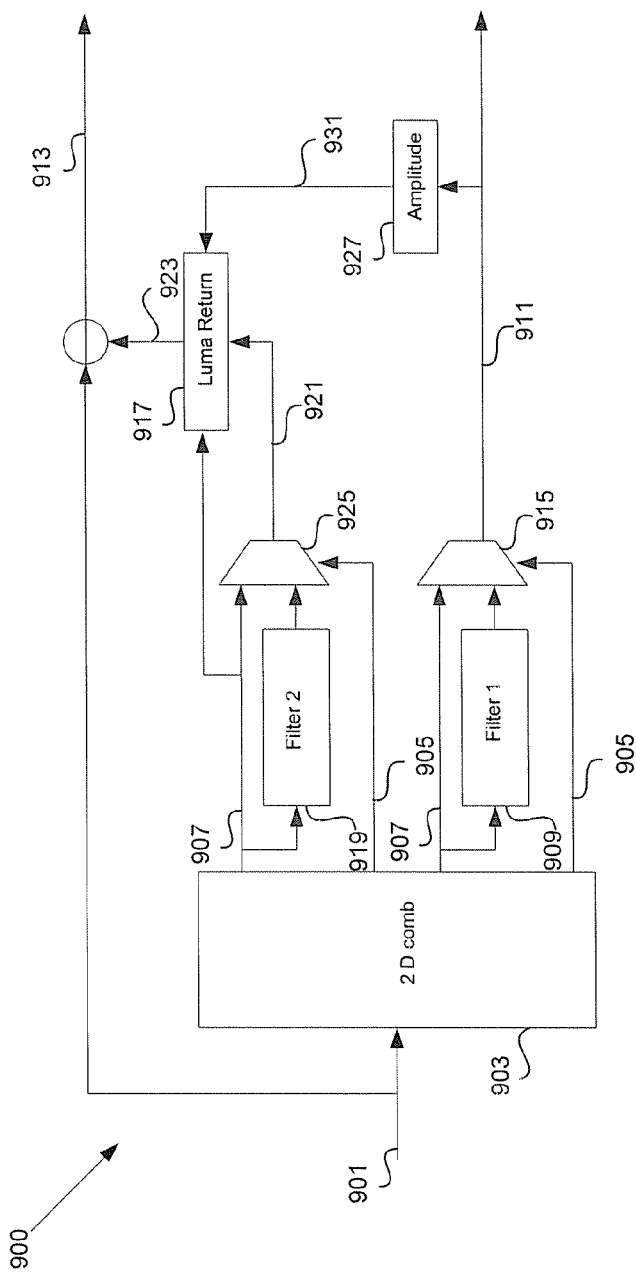
FIG. 9 is a diagram illustrating an exemplary video processing system implementing optimized non-complimentary 2D combing, in accordance with an embodiment of the present invention.

FIG. 9 is a diagram illustrating an exemplary video processing system implementing optimized non-complimentary 2D combing, in accordance with an embodiment of the present invention. Referring to FIG. 9, a video processing system 900 may comprise a 2D comb 903, two filters 909 and 919, blenders 915 and 925, amplitude-measuring block 927, and luma return block 917. A baseband composite input video signal 901 may be provided as an input to the 2D comb 903. The 2D comb 903 may then output two signals, a first signal 907 and a second signal 905. The first signal 907 may be the 2D chroma component of the baseband composite video signal 901. The second signal 905 may be the combing error. As a result of filtering, the 2D comb 903 may remove some of the energy of the chroma signal that may be caused by cross-chroma errors and luma.

The first filter 909 may be a narrowband filter and may filter the 2D chroma component 907, which may result in removing more energy, and removing large cross-chroma errors from the 2D chroma component 907. The blender 915 may then blend the output of the first filter 909 and the 2D chroma component 907. The control signal for the blender 915 may be the combing error signal 905, which was generated by the 2D comb 903. Based on the amount of combing error, the blender 915 may then select one of the two signals, either the 2D chroma component 907 or the twice-filtered 2D chroma component, or blend portions of the two signals, where the amount contributed by each signal may depend on the amount of combing error. When the combing error 905 is large or greater than a specified value, the twice-filtered 2D chroma component may be selected or a larger portion thereof may be selected for blending. When the coming error 905 is small or less than a specified value, the 2D chroma component 907 may be selected or a larger portion thereof may be selected for blending. The resulting chroma is then generated as a first new chroma signal 911.

The first new chroma signal 911 may then be provided as an input into the amplitude-measuring block 927. The amplitude of the first new chroma signal 911 may be output as the narrowband amplitude signal 931.

The second filter 919 may be a filter with a wider band than the first filter 909, and may filter the 2D chroma component 907, which may result in removal of some energy, and some cross-chroma errors from the 2D chroma component 907. However, the wider band filter may remove less energy than the narrowband filter. The blender 925 may then multiplex the output of the second filter 919 and the 2D chroma component 907. The control signal for the blender 925 may be the combing error signal 905, which was output by the 2D comb 903. Based on the amount of combing error, the blender 925 may then select one of the two signals, either the 2D chroma component 907 or the twice-filtered 2D chroma component, or blend portions of the two signals, where the amount contributed by each signal may depend on the amount of combing error. When the combing error 905 is large or greater than a specified value, the twice-filtered 2D chroma component may be selected or a larger portion thereof may be selected for blending. When the combing error 905 is small or less than a specified value, the 2D chroma component 907 may be selected or a larger portion thereof may be selected for blending. The resulting chroma may be generated as a second new chroma signal 921.

The narrowband amplitude signal 931, the second new chroma signal 921, and the 2D chroma component 907 may then be input to the luma return block 917. One rationale for adding the luma return is that if the first new chroma signal 911 is very small or less than a specified value, this may indicate that the associated region in the video may contain little chroma, and therefore more energy that was removed by the filters may be returned to the luma channel. On the other hand, if the first new chroma signal 911 is very large or greater than a specified value, that may indicate that the associated region in the video may contain a lot of chroma, and therefore the energy removed by the filters may need not be returned to the luma channel. This may be done according to the following equations:

Delta=second new chroma signal (921)−2D chroma component signal (907)

If (Delta>0) {Delta=MAX(0, Delta−narrowband amplitude signal (931))}

If (Delta<0) {Delta=MIN(0, Delta+narrowband amplitude signal (931))}

New adjusted chroma signal (923)=2D chroma component (907)+Delta

New luma signal (913)=baseband composite video signal (901)−New adjusted chroma signal (923)

The first new chroma signal 911 and the new luma signal 913 may then be displayed together.

The 2D comb 903 may be a conventional 2D comb, which may make a decision regarding the appropriate combing based on the content of the baseband composite input video signal 901. The decision may be based on a calculation of an error value, which may indicate how appropriate vertical combing may be for a current image. The error value may be utilized to evaluate combing of a plurality of possible combinations between the top, current, and bottom lines to find the output with the smallest amplitude. If there is a lot of luma energy in the chroma frequency band or the luma energy is greater than a specified value, the error value may exceed a certain threshold and as a result it may be determined that vertical combing may not be selected, and instead perform horizontal combing.

Figure 10:
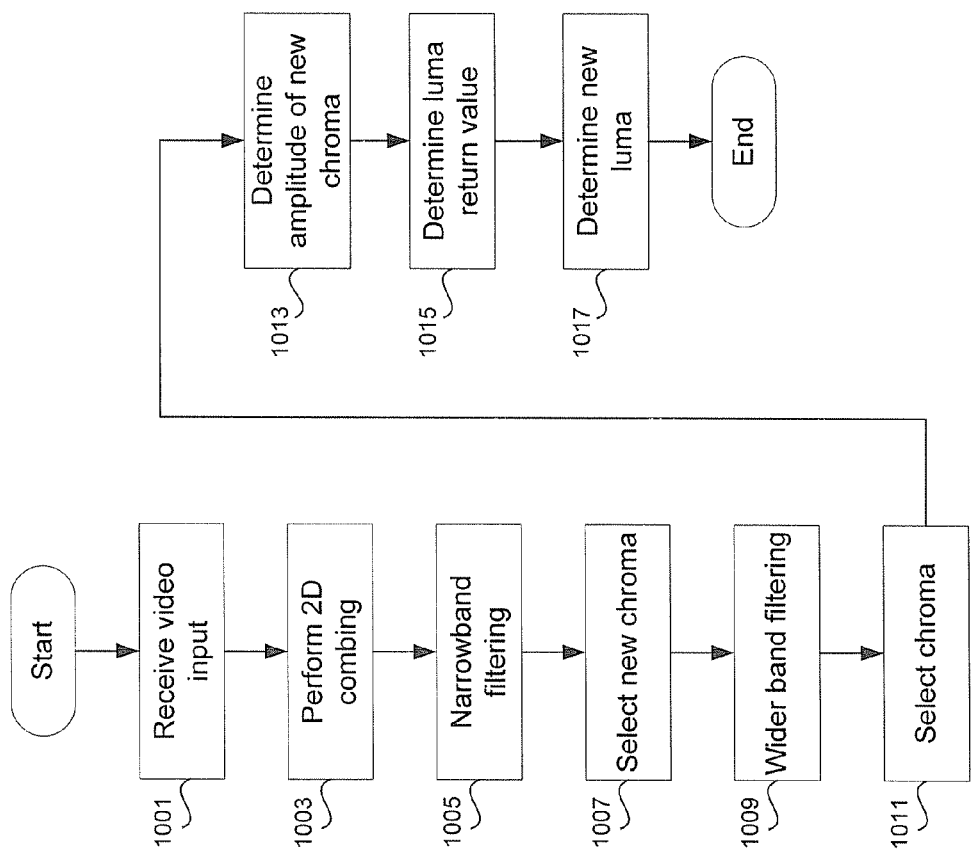
FIG. 10 is a flow diagram illustrating an exemplary method of implementating non-complimentary 2D combing, in accordance with an embodiment of the present invention.

FIG. 10 is a flow diagram illustrating an exemplary method of implementing optimized non-complimentary 2D combing, in accordance with an embodiment of the present invention. Referring to FIG. 9 and FIG. 10, at 1001 a baseband composite video signal 901 may be input into a video processing system 900. The baseband composite video signal 901 may comprise video data, which may include chroma and luma components. The baseband composite video signal 901 may then be processed by applying a 2D comb 903 at 1003. The output of the 2D comb 903 may comprise the chroma of the input signal and a combing error value associated with the processed video image. The chroma signal output by the 2D comb 903 may have some of the cross-chroma energy and luma energy removed as a result of filtering, hence enhancing the chroma. At 1005, a narrowband filter 909 may filter the chroma value output by the 2D comb 903, and as a result generate a twice-filtered chroma signal, where the twice-filtered chroma signal may have less cross-chroma energy and luma energy than the chroma output by the 2D comb 903. The chroma signal output by the 2D comb 903 and the twice-filtered chroma signal output by the narrowband filter 909 may then be blended to generate a new chroma signal at 1007. The combing error value output by the 2D comb 903 may be used as a control signal in blending the two chroma signals. If the error value is not too large or less than a specified value, that may indicate that the chroma signal output by the 2D comb 903 had most of the cross-chroma and luma energy removed, then there may be no need to utilize the twice-filtered chroma signal or a smaller portion thereof may be blended. If the error value is too large or greater than a specified value, then the twice-filtered chroma signal may be selected instead or a larger portion thereof may be blended.

At 1009, a second filter 919 with a wider band than the first filter 909 may filter the chroma value output by the 2D comb 903, and as a result output a twice-filtered chroma signal, where the twice-filtered chroma signal may have less cross-chroma energy and luma energy than the chroma output by the 2D comb 903, but the amount of energy removed by the second filter 919 may be less than the amount of energy removed by the first filter 909. The chroma signal output by the 2D comb 903 and the twice-filtered chroma signal output by the second filter 919 may then be blended to generate a new chroma signal at 1011. The combing error value output by the 2D comb 903 may be used as a control signal in blending the two chroma signals. If the error value is not too large or less than a specified value, this may indicate that the chroma signal output by the 2D comb 903 had most of the cross-chroma and luma energy removed, then there may be no need to utilize the twice-filtered chroma signal or a smaller portion thereof may be blended. If the error value is too large or greater than a specified value, then the twice-filtered chroma signal may be selected instead or a larger portion thereof may be blended.

At 1013, the amplitude of the new chroma signal 911 may be determined. Then, at 1015, the amplitude of the new chroma signal, the second new chroma signal, and the chroma signal output by the 2D comb may be utilized to determine a luma return value. The luma return value may be used to adjust the second new chroma signal, as shown by the equations above, and at 1017. The resulting adjust new chroma signal may be used to determine the new luma value by subtracting the adjust new chroma signal from the input broadband composite video signal 901. The new luma value and the new chroma value may be combined for display.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for optimizing combing in a video processing system, the method comprising:
generating a chroma component and a filtering error value based on filtering a baseband video signal;
generating a first subsequent chroma component based on said generated chroma component;
generating a first chroma component using said filtering error to blend said generated chroma component and said first subsequent chroma component;

generating a luma component from said baseband video signal based on said generated first chroma component;

generating a second subsequent chroma component based on said generated chroma component; and generating a second chroma component using said filtering error to blend said generated chroma component and said second subsequent chroma component.

2. The method according to claim 1, wherein said filtering said baseband video signal comprises 2D combing.

3. The method according to claim 1, wherein generating said first subsequent chroma component comprises filtering said generated chroma component using a first filter.

4. The method according to claim 3, wherein said first filter comprises a narrowband filter.

5. The method according to claim 1, wherein generating said luma component comprises subtracting said generated first chroma component from said baseband video signal.

6. The method according to claim 1, comprising displaying said luma component and said generated chroma component.

7. The method according to claim 1, wherein generating said first subsequent chroma component comprises filtering said generated chroma component using a first filter and generating said second subsequent chroma component comprises filtering said generated chroma component using a second filter, wherein said second filter has a narrower band than said first filter.

8. The method according to claim 1, comprising:
determining an amplitude of said generated second chroma component;
selecting one of:
said generated first chroma component and said generated chroma component based on said determined amplitude; and
generating said luma component by subtracting from said baseband video signal said selected one of:
said generated first chroma component and said generated chroma component.

9. The method according to claim 1, comprising displaying said luma component and said generated second chroma component.

10. A system for optimizing combing in a video processing system, the system comprising:
at least one processor that enables generating a chroma component and a filtering error value based on filtering a baseband video signal;
said at least one processor enables generating a first subsequent chroma component based on said generated chroma component;
said at least one processor enables generating a first chroma component using said filtering error to blend said generated chroma component and said first subsequent chroma component;

said at least one processor enables generating a luma component from said baseband video signal based on said generated first chroma component;

said at least one processor enables generating a second subsequent chroma component based on said generated chroma component; and said at least one processor enables generating a second chroma component using said filtering error to blend said generated chroma component and said second subsequent chroma component.

11. The system according to claim 10, wherein said filtering said baseband video signal comprises said at least one processor enables 2D combing.

12. The system according to claim 10, wherein generating said first subsequent chroma component comprises said at least one processor enables filtering said generated chroma component using a first filter.

13. The system according to claim 12, wherein said first filter comprises a narrowband filter.

14. The system according to claim 10, wherein generating said luma component comprises said at least one processor enables subtracting said generated first chroma component from said baseband video signal.

15. The system according to claim 10, comprising said at least one processor enables displaying said luma component and said generated chroma component.

16. The system according to claim 10, wherein generating said first subsequent chroma component comprises said at least one processor enables filtering said generated chroma component using a first filter and said at least one processor enables generating said second subsequent chroma component comprises filtering said generated chroma component using a second filter, wherein said second filter has a narrower band than said first filter.

17. The system according to claim 10, comprising:
said at least one processor enables determining an amplitude of said generated second chroma component;
said at least one processor enables selecting one of:
said generated first chroma component and said generated chroma component based on said determined amplitude; and
said at least one processor enables generating said luma component by subtracting from said baseband video signal said selected one of:
said generated first chroma component and said generated chroma component.

18. The system according to claim 10, comprising said at least one processor enables displaying said luma component and said generated second chroma component.

* * * * *